June 22, 1948. C. MORRISON ET AL 2,443,987
WORK HOLDER
Filed Oct. 13, 1945 2 Sheets-Sheet 1

Inventors
Clifford Morrison
Joseph F. Hoch
By
Attys.

Inventors
Clifford Morrison
Joseph F. Hoch
By
Attys

Patented June 22, 1948

2,443,987

UNITED STATES PATENT OFFICE 2,443,987

WORK HOLDER

Clifford Morrison, Rosemead, and Joseph F. Hoch, Arcadia, Calif.; said Hoch assignor to O. H. Calhoun and Adela H. Calhoun, both of Los Angeles, Calif.; said Morrison assignor to Western Equipment Company, a copartnership composed of Oliver H. Calhoun and Adela H. Calhoun Application October 13, 1945, Serial No. 622,200

5 Claims. (Cl. 90—59)

Our invention has to do with work holders, relating in its more particular aspects to work holders or chucks wherein the work is retained against the holder by means of vacuum, this application being a continuation in part of our application Serial No. 606,910, filed July 25, 1945, and now abandoned.

While our invention has various applications, perhaps one of its chief advantages is found in its adaptation as a holder for relaitvely large sheet stock on machine tools such as milling machines, shape cutters and the like. Great difficulty has heretofore been experienced in performing machining operations upon large sheet stock, particularly where the machining must be confined within extremely small tolerances, because of the practical difficulties attending holding of the work sheets absolutely stationary in the desired position on the machine without interfering with operation of the machine tool. Electromagnetic chucks, or work holders, have comprised about the only successful means of properly retaining such large flat work sheets on the machine, but the use of electromagnetic chucks is, of course, limited to use where the metal sheets are capable of being attracted by the electromagnet. Consequently, non-magnetic materials cannot be held by such a holder.

We are aware that vacuum work holders have been proposed, but those of which we are aware have had serious shortcomings which have prevented them from going into any general or extensive use. For instance, they have been of a type wherein the holder does not provide sufficient lands or bearing surfaces for the work sheet to positively retain the sheet in stationary position, or else they have been provided with roughened bearing surfaces or lands, which surfaces seriously damage the contacting surface of the work sheet. For instance, plastic sheets are easily damaged when held against a relatively rough surface by the vacuum required for practical purposes, and sheets which have a thin coating of some finishing material are likewise easily damaged by such bearing surfaces.

Another disadvantage of such roughened surfaces has been the practical difficulties of forming the surface and of providing a predetermined work-engaging or bearing surface. Burrs and the like usually are left exposed to the work sheet, which not only cause damage to the finish but also result in non-uniform work. Even the slightest burr or unevenness on the surface of the chuck may raise a thin sheet at some local spot and if the sheet is being machined to extremely fine tolerances may result in the sheet being machined to relatively thick and thin sections necessitating its rejection.

It is therefore among the objects of our invention to overcome those disadvantages and to provide a vacuum work holder which is capable of positively retaining a work sheet in absolutely stationary position without any damage to the surface of the work sheet.

It is a further object of our invention to provide a vacuum work holder which may be used to successfully hold work on machine tools for being operated upon to extremely fine tolerances.

A further object is to provide a vacuum work holder wherein a maximum and definitely predeterminable bearing surface is presented to be contacted by the work sheet without interferring with the application of effective vacuum.

Our invention is further characterized by the novel form and arrangement of the means for providing the vacuum chamber or chambers which it utilizes as well as the novel sealing gaskets which it provides.

Still further objects and corresponding advantages will become apparent from the following detailed description of a presently preferred embodiment of the invention, for which purpose we shall refer to the accompanying drawings, in which.

Figure 1:
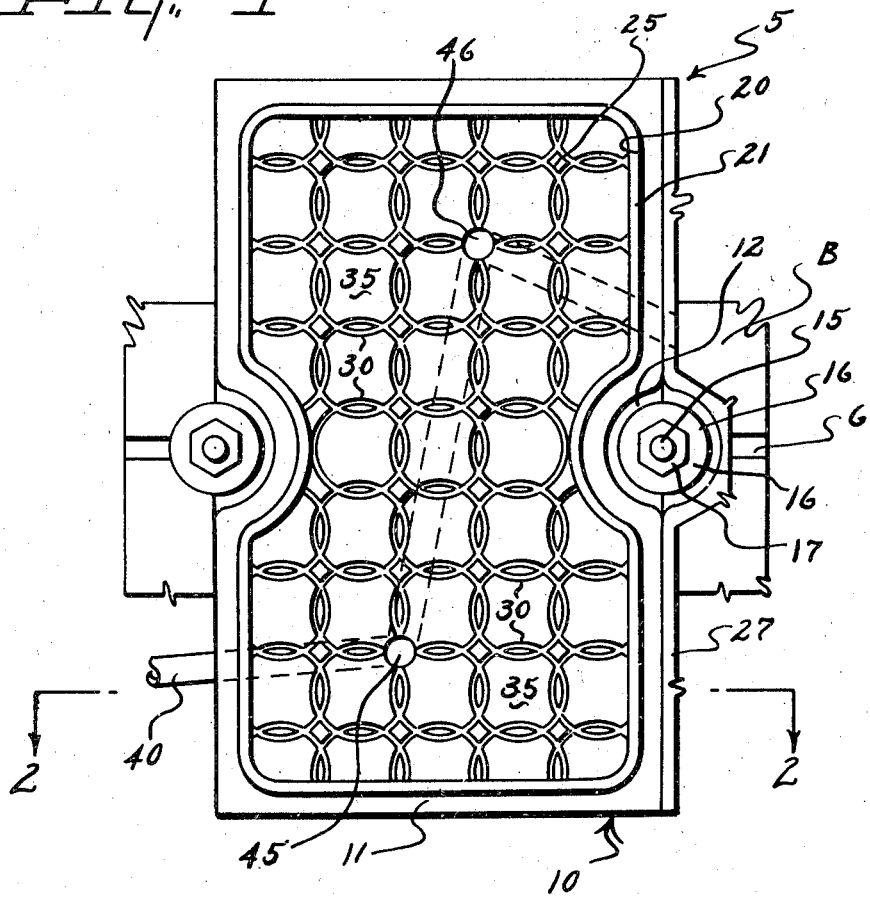
Fig. 1 is a top plan view of a work holder mounted on the bed of a machine tool.

We wish it understood, however, that the following description is to be considered merely as illustrative since, within its broader scope as defined by the appended claims, our invention is susceptible of various other specific applications and may be embodied in other and modified physical forms which the ensuing description will suggest to those working in this art.

Referring now to the drawings, we show at B the bed of a machine tool, such as a conventional milling machine, presenting the usual T groove G.

Our improved work holder is generally designated by the numeral 5 and, in the particular form and embodiment illustrated, consists of a body or plate 10 of rectangular plan and whose top surface 11 is plane except that it has opposite side recesses 12 for the reception of means for securing it to a machine, such means being here shown as bolts 15 and washers 16, the bolts having head portions engaging in the T groove G to retain the body firmly on the bed, being secured by nuts 17.

Figure 4:
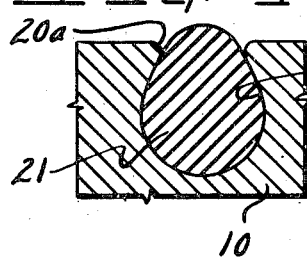
Fig. 4 is an enlarged cross sectional view of the sealing gasket shown in Figs. 1, 2 and 3.
Figure 5:
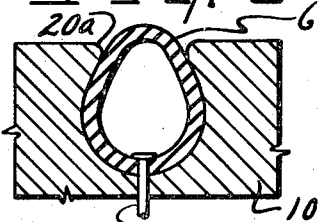
Figs. 5 and 6 are, respectively, enlarged cross-sectional views showing modified forms of gaskets.
Figure 6:
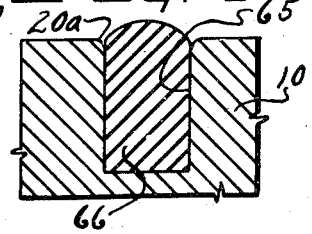

The top surface 11 of the body is provided with a continuous groove 20, which may be formed to either of the cross-sections shown in Figs. 4, 5 and 6 or in any other suitable section, and carrying a continuous gasket 21 of soft rubber or the like. The gasket surrounds and defines a field or work-bearing surface 25.

It will be understood that while we here show in full only one unit of the body, as many units may be used as may be desired, the units being connected together by suitable vacuum lines leading to a common vacuum pump. A fragmentary portion of a second identical unit is shown at 27 in Fig. 1.

One of the characteristic features of the invention resides in the construction and arrangement now to be described by which we accomplish maximum and predetermined work-bearing surfaces or lands in the field and at the same time safeguard the surface of the work sheet against damage.

Figure 2:
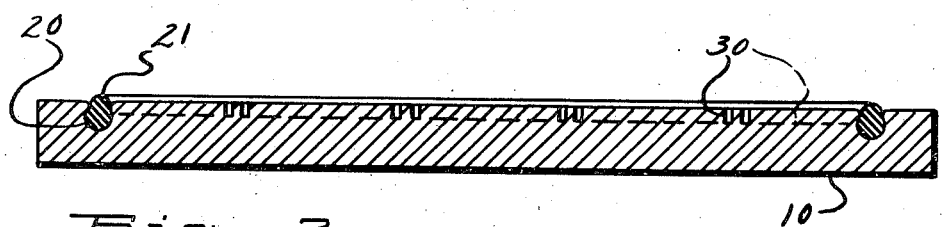
Fig. 2 is an enlarged section on line 2—2 of Fig. 1.
Figure 3:
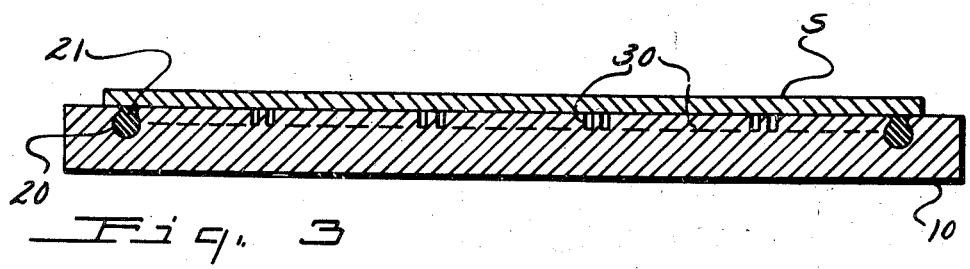
Fig. 3 is a view similar to Fig. 2 but showing a work sheet being held against the bearing surface of the work holder.

As will be noted in Figs. 1, 2 and 3, the field has provided in its top surface a plurality of intercommunicating annular or continuous shallow grooves 30. Since each of the annular grooves intersects or overlaps one or more adjacent grooves, all the grooves in the field intercommunicate and may be evacuated by a single suction line, the entire field being sealed against entrance of air by the continuous gasket 21. The outermost of the grooves 30 are closely adjacent the gasket so as to provide maximum bearing surface. In practice each of the annular grooves is of a depth of the order of 1/64 inch and of the order of two inches in diameter. Those are the dimensions which we have found in practice to be efficient, although other dimensions and shapes of grooves may be used.

Thus there is surrounded by each groove 30 a land 35, the combined area of the lands substantially defining the work-bearing surface.

So that air may be evacuated from the grooves 30 we provide a vacuum line 40 which is connected to a vacuum pump not shown, and communicates with the grooves through openings 45, 46 through the body. Where a series of units is employed, the vacuum line 40 may be extended to communicate with the fields of the remaining units.

Thus, as shown in Fig. 3, when a work sheet S is placed flatly on the body, resting initially against the gasket, a vacuum is then applied through line 40, the air being exhausted first from the field surrounded by the gasket and this vacuum then draws the adjacent face of the work sheet firmly against the lands 35, flattening or pressing the gasket into its groove 20, the top edges of whose side walls are rounded, so that the gasket is confined entirely to the groove and does not become interposed between the work sheet and the field. A solid, firm support is thus provided for the work sheet.

In Figs. 4, 5 and 6 we show three forms of gasket which we have found particularly efficient in our device. In the form of Fig. 4, which is a cross-section of the gasket 21 and its groove 20, the groove and gasket are somewhat ovate in cross-section, the sides of the groove merging into the top surface of the body by the abovementioned curved portions 20a to insure that the gasket will be confined to the groove when compressed.

If the field and work sheet present true conforming surfaces capable of providing an effective seal at all times, the gasket might be eliminated, but we have found the use of the gasket to be desirable for all practical uses.

In the form of gasket shown in Fig. 5, the gasket 60 is tubular and is inflated with fluid under pressure through valve 61, and is particularly advantageous in some uses to afford a more positive seal.

It will be noted that in the gaskets of both Figs. 4 and 5 the larger diameter portions of the gaskets are below the top surface of the body, which secures the gasket against escape.

In the form of gasket shown in Fig. 6, the side walls of the groove 65 are substantially parallel and the gasket 66 is similarly shaped in cross-section except that its top surface is rounded.

Figure 7:
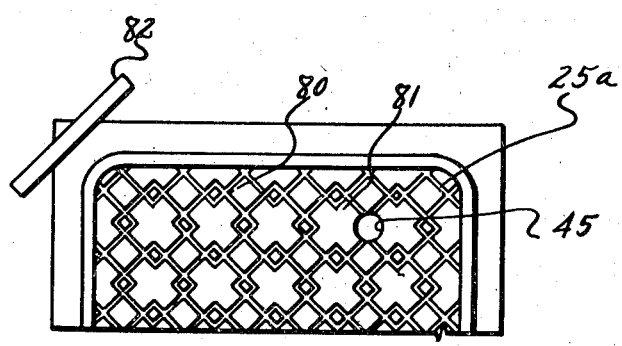
Fig. 7 shows a further modified form of the invention.

While we find the annular grooves preferable and peculiarly adaptable to being formed by machining, it will be understood that other forms of intercommunicating grooves may be substituted, and in Fig. 7 we show a modification wherein the field 25a of the body is provided with a plurality of overlapping, intercommunicating, diamond-shaped grooves 80 surrounding diamond-shaped lands 81. We also show in Fig. 7 a modified means of securing the body to the bed of the machine tool, the securing means being here shown as bars 82 disposed diagonally over each corner portion of the body and in turn secured at its ends to the bed of the machine tool.

Figure 8:
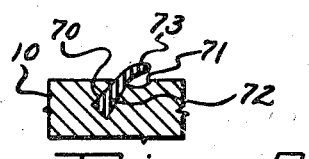
Fig. 8 is a cross-sectional view showing another modified form of gaskets.

In Fig. 8 is shown a further modified form of gasket. Here a continuous groove 70 is provided in the body 10, slanting towards the outer edge of the body and tapering from a wider bottom to a relatively narrow top end, the body being provided additionally with an auxiliary groove 71 adjacent and parallel to groove 70. A soft rubber gasket 72 is shaped to fit in groove 70 and projects at its top end portion 73 into position somewhat overhanging auxiliary groove 71. When the field surrounded by gasket 70 is evacuated of air, the work sheet presses the gasket portion 73 into the auxiliary groove 71.

We claim:

1. In a vacuum work holder, a body presenting a plane surface provided with a continuous marginal groove and having, within the area surrounded by the groove, a plurality of shallow intercommunicating channels, the outermost of which intersect and communicate with the groove, said plane surface being exposed for contact by work being held and said channels and groove being disposed to be exposed to said work, a flexible gasket mounted in said groove, said gasket being of a cross-sectional shape to normally project above the plane of said surface but which is sufficiently flexible to be flexed completely into the groove when engaged by the work, and means for evacuating air from said channels and groove at points contiguous to the groove.

2. In a vacuum work holder for securing sheet stock on a machine tool, a body having means for securing it on said tool and presenting a plane, hard, exposed sheet engaging surface interrupted by a relatively deep, continuous marginal gasket receiving groove and interrupted throughout the area surrounded by the groove by a plurality of relatively shallow intercommunicating channels the outermost of which intersect and communicate directly with the groove at points spaced apart therealong, and suction means for evacuating air from the channels and groove.

3. In a vacuum work holder for securing sheet stock on a machine tool, a body having means for securing it on said tool and presenting a plane, hard, exposed sheet engaging surface interrupted by a continuous, marginal gasket-receiving groove and interrupted throughout the area surrounded by the groove by a plurality of intercommuicating channels the outermost of which intersect and communicate directly with the groove at points spaced apart therealong; said body having a plurality of air exhausting ports communicating with the groove through some of said groove intersecting channels at relatively widely spaced points.

4. In a vacuum work holder for securing sheet stock on a machine tool, a body having means for securing it on said tool and presenting a plane, exposed sheet engaging surface interrupted by a continuous marginal groove and interrupted throughout the area surrounded by the groove by a plurality of intercommunicating channels the outermost of which intersect the innerside wall of the groove at spaced points above the bottom of the groove, and a continuous flexible gasket mounted in the groove out of sealing engagement with the outer ends of the said groove-intersecting channels; said body also having a plurality of air exhausting ports communicating with the groove at spaced points therealong through said last named channels.

5. In a vacuum work holder for securing sheet stock on a machine tool, a body presenting a plane, hard, exposed surface interrupted by a continuous marginal gasket-receiving groove and interrupter throughout the area surrounded by the groove by a series of parallel, overlapping and intercommunicating rows of overlapping and intercommunicating circular channels defining smooth sheet engaging lands, and suction means for evacuating air from the channels and groove.

CLIFFORD MORRISON.
JOSEPH F. HOCH.

REFERENCES CITED

The following references are of record in the file of this patent:

UNITED STATES PATENTS

| Number | Name | Date |
|---|---|---|
| Re. 12,604 | Bagnall | Feb. 12, 1907 |
| 822,096 | Bagnall | May 29, 1906 |
| 1,041,028 | Church | Oct. 15, 1912 |
| 1,082,134 | Patton | Dec. 23, 1913 |
| 1,294,103 | Hitchcock | Feb. 11, 1919 |
| 2,133,518 | Huebner | Oct. 18, 1938 |
| 2,200,536 | Bungay | May 14, 1940 |
| 2,367,839 | Grover | Jan. 23, 1945 |

FOREIGN PATENTS

| Number | Country | Date |
|---|---|---|
| 12,595 | Great Britain | May 1, 1849 |